(12) United States Patent
Hevenor et al.

(10) Patent No.: US 6,170,727 B1
(45) Date of Patent: Jan. 9, 2001

(54) WEB HAVING ALIGNMENT INDICIA AND AN ASSOCIATED WEB FEEDING AND WORKING APPARATUS

(75) Inventors: Charles M. Hevenor, Glastonbury; Thomas A. Gordon, South Glastonbury, both of CT (US)

(73) Assignee: Gerber Scientific Products, Inc., Manchester, CT (US)

( * ) Notice: Under 35 U.S.C. 154(b), the term of this patent shall be extended for 0 days.

(21) Appl. No.: 09/421,833

(22) Filed: Oct. 20, 1999

Related U.S. Application Data

(62) Division of application No. 09/165,769, filed on Oct. 2, 1998, which is a division of application No. 08/962,758, filed on Nov. 3, 1997.

(51) Int. Cl.[7] .................................................. B65H 23/038
(52) U.S. Cl. .................................................. 226/21; 226/16
(58) Field of Search .................................. 226/2, 15, 16, 226/21, 22, 23, 20

(56) References Cited

U.S. PATENT DOCUMENTS

| | | | |
|---|---|---|---|
| 2,802,666 | * | 8/1957 | Crosfield ................................ 226/16 |
| 2,820,907 | * | 1/1958 | Silverman ............................. 226/16 |
| 3,078,021 | * | 2/1963 | Crownfield et al. .................... 226/21 |
| 3,254,300 | * | 5/1966 | Prell ...................................... 226/20 |
| 3,300,114 | * | 1/1967 | Jacobsen ............................... 226/16 |
| 3,608,797 | * | 9/1971 | Hindle et al. .......................... 226/22 |
| 4,261,498 | * | 4/1981 | Short ..................................... 226/15 |
| 4,485,982 | * | 12/1984 | St. John et al. ...................... 226/20 |
| 4,572,417 | * | 2/1986 | Joseph et al. .......................... 226/21 |
| 4,731,542 | * | 3/1988 | Doggett ................................. 226/20 |
| 5,276,460 | * | 1/1994 | Miyajima .............................. 226/15 |
| 5,460,312 | * | 10/1995 | Brau et al. ............................ 226/15 |

FOREIGN PATENT DOCUMENTS

89/10888 * 11/1989 (WO) .

* cited by examiner

Primary Examiner—John M. Jillions
(74) Attorney, Agent, or Firm—McCormick, Paulding & Huber LLP

(57) ABSTRACT

A web and an associated web feeding and handling apparatus for performing a work operation on the web is disclosed. The apparatus feeds the web in a feed direction longitudinally of itself by means of a friction drive. The operation of the drive is controlled by lateral and longitudinal alignment indicia located on the web which insure that the web is properly aligned with the feed direction as the web is initially fed into and then through the apparatus, and to insure that any bowing of the web during the work operation is corrected or compensated for.

11 Claims, 10 Drawing Sheets

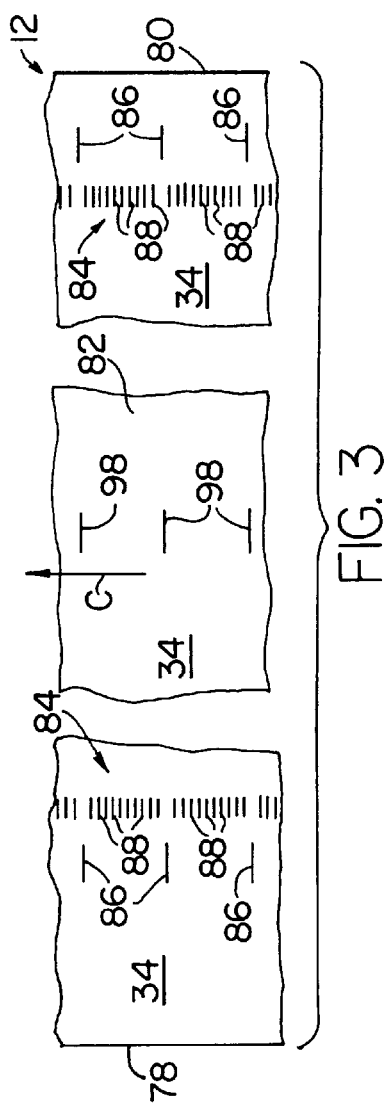
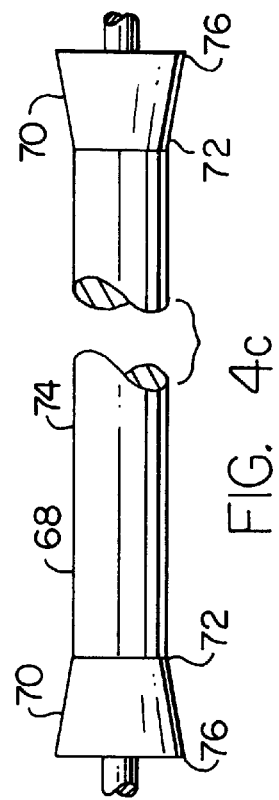
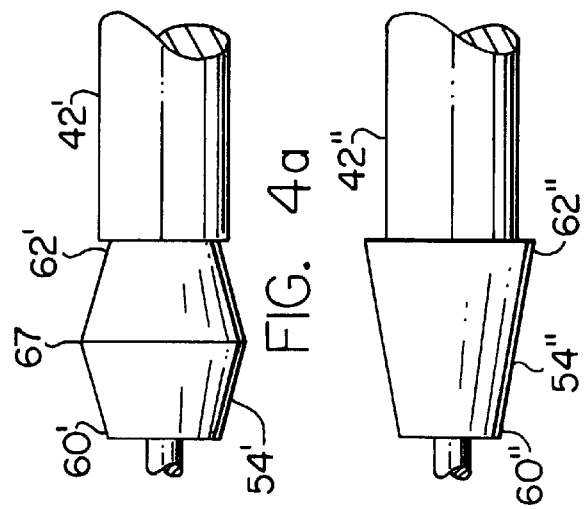
FIG. 3
FIG. 4a
FIG. 4b
FIG. 4c

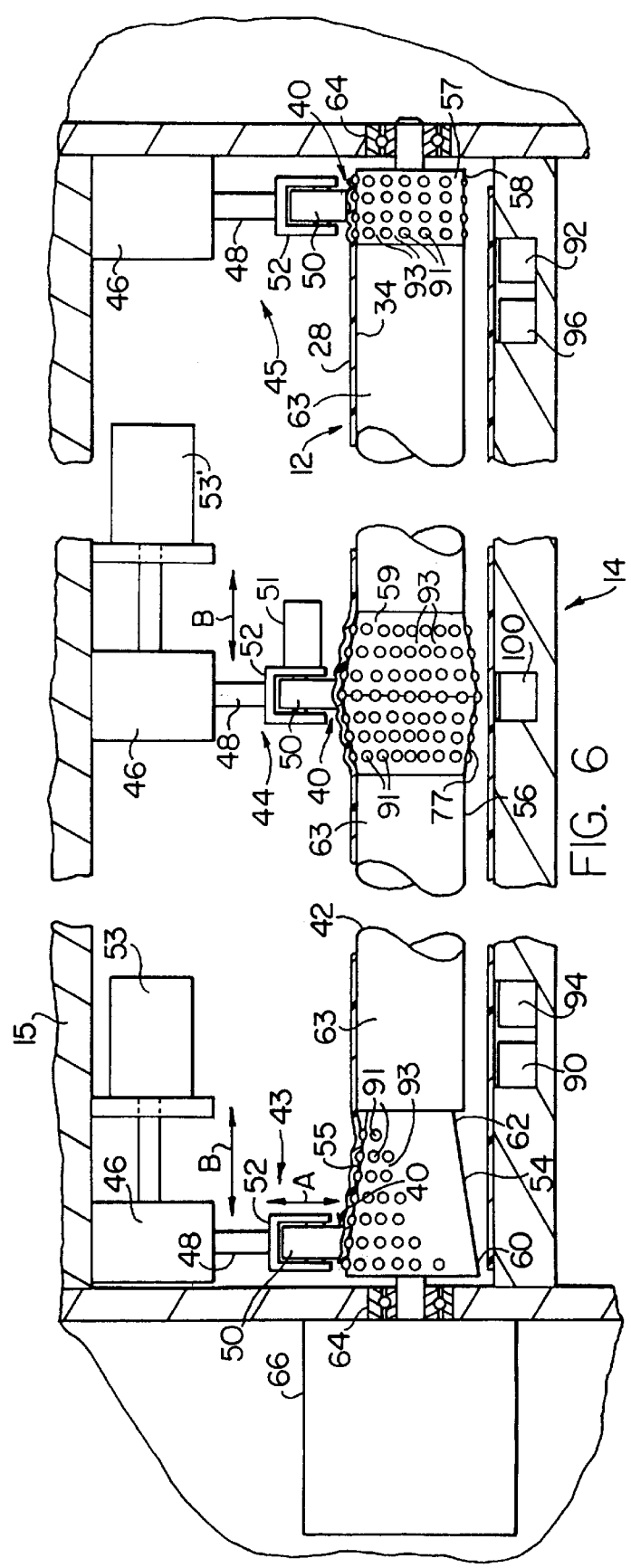

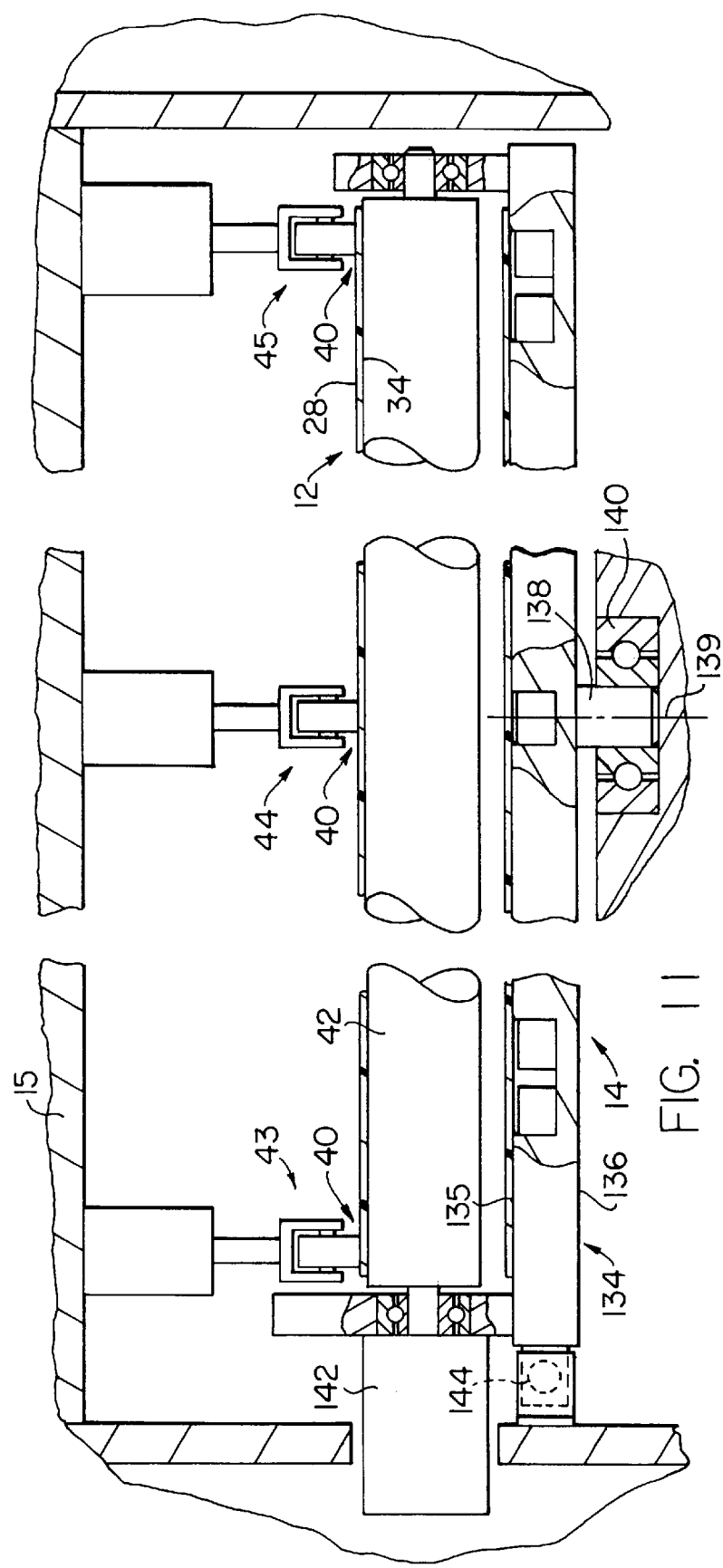

WEB HAVING ALIGNMENT INDICIA AND AN ASSOCIATED WEB FEEDING AND WORKING APPARATUS

This is a divisional of-pending application Ser. No. 09/165,769 filed on Oct. 2, 1998 which is a divisional of-pending application Ser. No. 08/962,758 filed on Nov. 3, 1997.

BACKGROUND OF THE INVENTION

The present invention relates to a sheet material web and an associated web feeding and handling apparatus which feeds the web in a feed direction longitudinally of itself and performs a work operation on the web. The invention deals more particularly with such an apparatus having a friction drive for feeding the web through the apparatus, and alignment indicia on the web which the apparatus reads as the web is fed to maintain the web in proper alignment with respect to the feed direction.

The present invention may be used with various types of apparatus for performing a work operation on a web of sheet material such as a plotter, a recorder, or a signmaking apparatus. However, for the purposes of clarity and simplicity, the invention will be disclosed in connection with the description of a signmaking apparatus.

Typically, information describing a desired sign graphic, such as an alphanumeric inscription or a geometric shape, is programmed into the signmaking apparatus to cause it to automatically cut the graphic from a continuous length of signmaking web stock. The web stock is stored as a roll and is drawn by a pair of feed sprockets having pins which cooperate with rows of holes punched or otherwise formed in two side edge portions of the web. The sprocket drive not only serves to feed the web through the signmaking apparatus, but also provides a means for maintaining the web in proper alignment with respect to the feed direction as the web is fed and worked on by the apparatus. That is, the sprocket drive prevents skewing of the web to either the right or left of the feed direction as the web is fed through the device.

The signmaking apparatus described above, as well as other web working apparatus, may handle a variety of types of webs and may operate with various types of instruments. For example, the signmaking apparatus is often used to plot a sign pattern on a paper web before the relatively expensive signmaking stock is cut. This being the case, it would be advantageous to have a web and an associated web handling apparatus that did not require a sprocket drive and a corresponding pattern of sprocket holes punched in the web for feeding the web and maintaining it in alignment during the work operation. Elimination of the sprocket drive and the hole pattern in the web would not only reduce the cost of both the apparatus and the web, but also would allow for a simple and rapid interchange of the various types of webs used with the apparatus.

One known alternative to a sprocket drive is a drive whereby a sheet of work material is fed through a nip formed by at least two roller elements, one of which is driven. The pressure exerted on the work material by the roller elements, acts to pull the work material through the nip. Drives of this type are referred to by those skilled in the art as, friction drives.

In order for a piece of sheet material to be fed through a friction drive and maintain its alignment, the diameter of the rolling elements must be identical along the width of the sheet material. This has proven to be difficult because slight variations in the diameter of the rolling elements results in the work material becoming skewed relative to the direction in which it is being fed. In addition, the rolling elements in a friction drive have the tendency to skid on the work material, thereby further exacerbating the difficulties described above.

Historically, the mechanism by which manufacturers of friction drives have attempted to overcome the deleterious effects of material misalignment has been the grit wheel. Grit wheels generally take the form of cylinders sequentially spaced along the length of a roller. Each grit wheel has an anti-skid treatment on its outer periphery. In order to ensure that the work material feeds through the apparatus without becoming skewed, the outer diameters of all of the grit wheels used on a particular roller must be identical, as such they can become quite expensive. Moreover, since the grit wheels are manufactured as matched sets, if one grit wheel wears faster than another, all of them must be reworked or replaced.

In addition to the foregoing, it should also be appreciated that as the cutter or plotting pen of the signmaker works on the web, it can create a drag in the center portion or work area of the web. Therefore, the web tends to bow in the lateral direction as it is fed through the apparatus and the work operation is performed. Even a sprocket drive which effectively maintains the web in alignment with the feed direction, does little to correct the lateral bowing of the web that occurs during the work operation.

It is therefore an object of the present invention to provide a sheet material web and an associated web handling apparatus which do not utilize a sprocket drive and a corresponding pattern of sprocket holes formed in the web to feed the web through the apparatus and maintain proper web alignment.

It is a further object of the present invention to provide such a web and associated handling device, wherein lateral bowing of the web during the work operation is either compensated for or eliminated.

It is still another object of the present invention to provide a web handling device which can actively compensate for web misalignment.

SUMMARY OF THE INVENTION

The present invention meets these and other objects by providing, in one aspect, a web for use with a web feeding and handling apparatus which utilizes a friction drive for feeding the web back and forth along a feed path through the apparatus. The web comprises an elongated worksheet having a work surface, an opposite surface and two parallel edge portions, all of which extend along the length of the worksheet. The worksheet also has a work area for working by a tool supported on the web handling apparatus. The work area is located between the two parallel edge portions and extends along the length of the worksheet. Lateral alignment indicia are located on the opposite surface of the worksheet along its length and are positioned within at least one of the parallel edge portions. The lateral alignment indicia are readable by sensors mounted on the web handling apparatus to determine the lateral alignment of the web with respect to the feed direction as the web is fed into and then through the apparatus.

In a preferred embodiment of the invention, the previously described web also includes longitudinal alignment indicia located along the length of the worksheet and within the work area on either the work surface or the opposite surface of the worksheet. The longitudinal alignment indicia are readable by the aforementioned reading means to determine the longitudinal alignment of corresponding transverse positions across the work area and the lateral edge portions of the web, as the web is fed through the web handling apparatus and the work operation is performed.

According to another aspect of the present invention, a web feeding and handling apparatus is provided for feeding an elongated web of the above-described type along a feed path longitudinally of itself and for performing a work operation on the web. The apparatus comprises a friction drive for frictionally engaging and feeding the web in the feed direction, a tool engageable with the web and moveable relative thereto for performing work operations on the web, and a controller for issuing commands to the friction drive and the tool to move the web and the tool relative to one another during a work operation according to data defining a particular work operation to be performed on the web. In addition, the apparatus includes a means for reading the lateral alignment indicia on the web and generating output signals indicative of the web's alignment with respect to the feed direction. The controller receives the generated output signals and issues commands in response thereto to operate the friction drive so that the web is brought into proper alignment with the feed direction.

In the case where the web carries longitudinal alignment indicia, the sensor also reads these indicia and generates additional output signals indicative of the longitudinal alignment of corresponding transverse positions across the work area and the lateral edge portions of the web. Based on these output signals, the controller operates the friction drive to maintain the longitudinal alignment of these corresponding transverse positions or otherwise controls the work operation to account for any misalignment of these positions as the web is fed through the apparatus and the work operation is performed.

In one embodiment of the present invention, the friction drive includes a roller having a contoured end portion and a plurality of pinch wheels spaced transversely across the web. The roller and pinch wheels cooperate to define a plurality of nips for receiving and feeding the web in the feed direction. The position of at least one of the pinch wheels is moveable along the contoured portion of the roller for adjusting the alignment of the web with respect to the feed direction.

In another embodiment of the present invention, the roller employed by the friction drive is not contoured and the web feeding and handling apparatus includes a mechanism for displacing an end portion of the roller, relative to the remainder of the roller such that if the worksheet becomes skewed as it is being fed through the apparatus, the mechanism is actuated thereby forcing the worksheet back into alignment. The amount by which the roller is displaced is controlled by a drive, preferably of the piezoelectric type. A piezoelectric drive contains a crystal, or other electrically poled material, such as ferroelectric ceramics. These materials when strained become electrically polarized. Conversely, if an electric field is applied to these materials, they deform in a linear manner. As such a piezoelectric drive is one where an electric field is applied to the piezoelectric material thereby causing a concomitant linear deformation that can be used to move and/or deflect objects, such as the above-described roller.

In yet another embodiment of the present invention, the roller employed by the friction drive consists of a first and a second roller section. The first roller section is rotatably mounted to the frame at a first end. A first end of the second roller section is rotatably mounted to a second end of the first roller section. The second end of the second roller section is also rotatably mounted to the frame. A drive means is associated with the first roller section for driving it at a speed equal to, or different from the predetermined speed of the first roller section. During operation, if the web becomes skewed as it is being fed through the friction drive, the speed of the second roller section can be increased, or decreased to bring the web back into alignment. Once aligned, the speed of the second roller section will be matched to the speed of the first roller section.

BRIEF DESCRIPTION OF THE DRAWINGS

FIG. 3 is a sectional view taken along the line 3—3 in FIG. 2.

FIGS. 4a, 4b and 4c show alternative embodiments of the drive roller which forms a part of the apparatus shown in FIG. 1.

FIG. 6 is a fragmentary sectional view of an alternate embodiment of the apparatus of FIG. 1.

FIG. 11 is a sectional view of the apparatus of FIG. 10 taken through line 11—11.

DETAILED DESCRIPTION OF THE PREFERRED EMBODIMENTS

Figure 1:
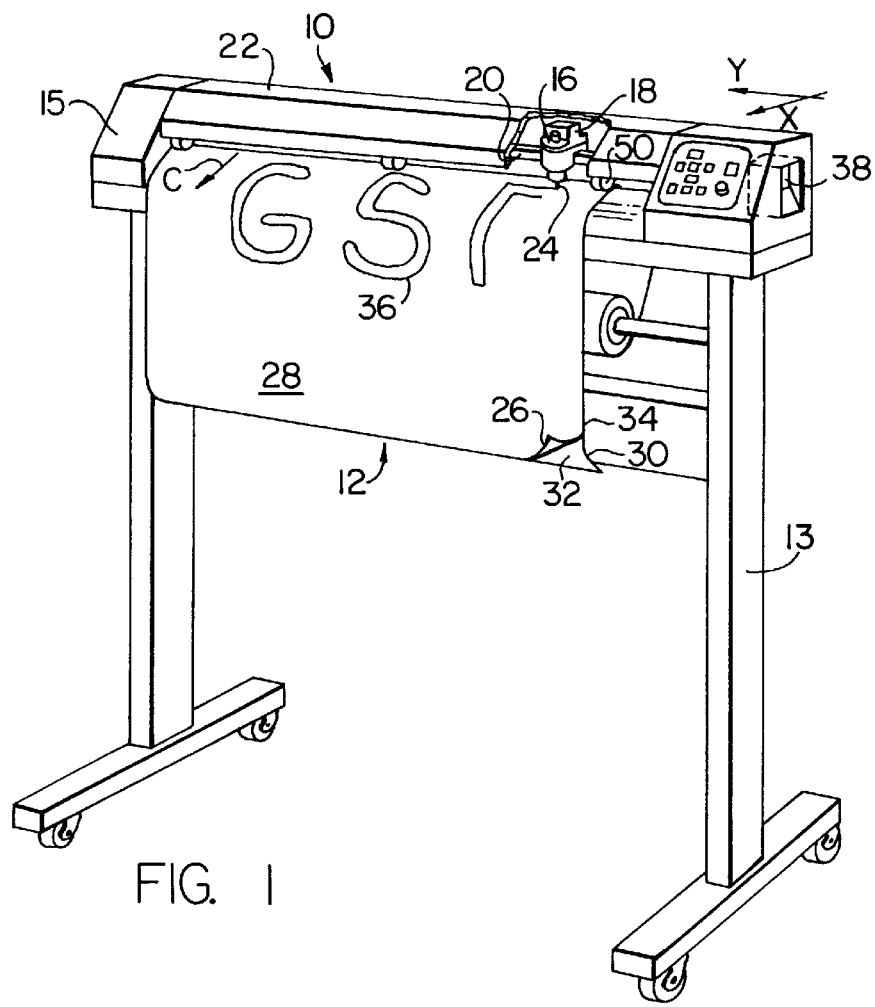
FIG. 1 is a front perspective of a web and an associated web feeding and handling apparatus embodying the invention.
Figure 2:
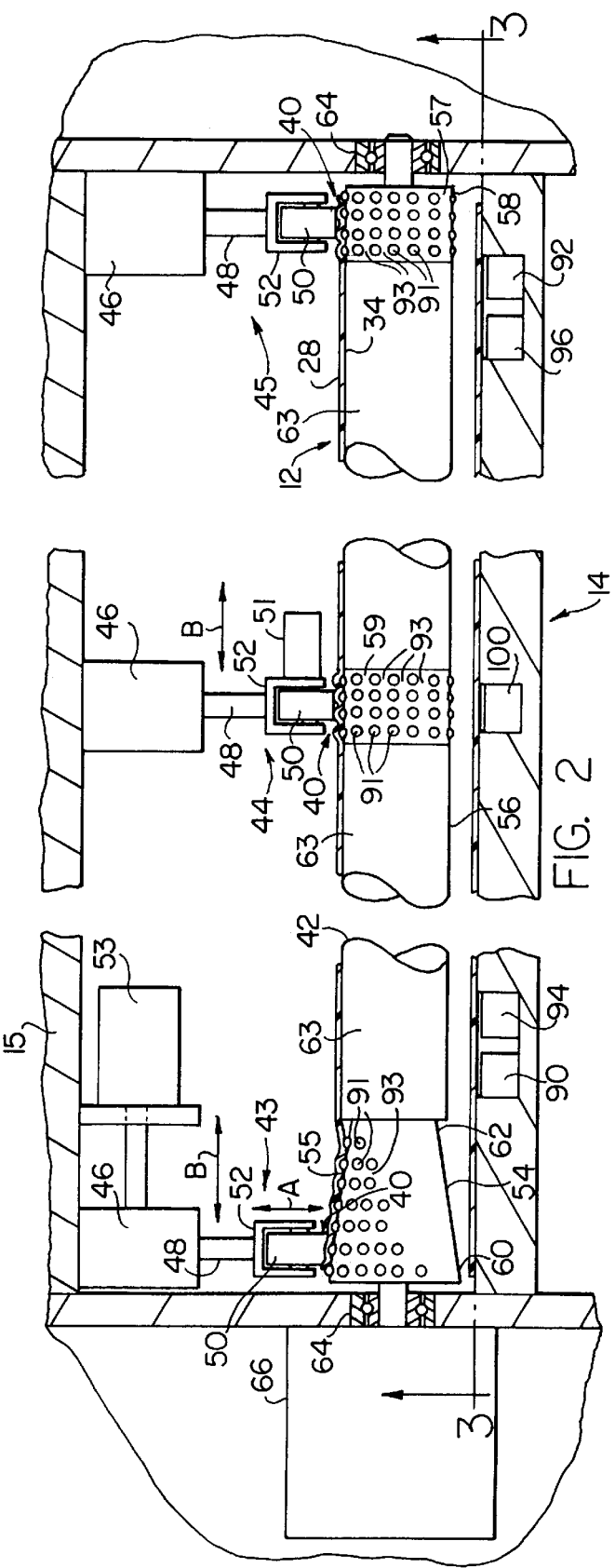
FIG. 2 is a fragmentary sectional view of the apparatus shown in FIG. 1.

Referring now to FIGS. 1 and 2, the apparatus of the present invention is illustrated as embodied within a signmaking apparatus 10. The signmaking apparatus 10 is supported on a moveable base 13 and includes a feed mechanism, generally shown at 14, mounted on the frame 15 of the apparatus for feeding the web 12 in an illustrated X-coordinate direction. The apparatus further includes a tool head 16 supported on a moveable carriage 18 which is suitably driven in an illustrated Y-coordinate direction relative to the web 12 along guide rail 20, also mounted on the frame 15. In FIG. 1, the apparatus 10 is shown with a cover 22 enclosing the tool head, carriage, guide rail and drive mechanism; however, in subsequent figures the cover 22 has been removed for clarity. While the apparatus of the present invention is described herein as being embodied within a signmaker, it is to be understood that the invention is not limited in this regard as it is equally applicable to other devices, such as printers and/or plotters.

In normal operation, the tool head 16 is equipped with a knife-type cutter or blade 24. The web 12 preferably consists of an elongated vinyl worksheet 26 having a work surface 28, the worksheet is supported on an elongated paper carrier 30 having a support surface 32 and an opposite surface 34. Due to the combined motion of the tool head 16 and the web 12, the above-described apparatus is able to cut graphics of virtually any shape from the web 12, such as the illustrated graphic 36. These cut shapes can then be transferred to a sign base to form a finished sign.

The signmaking apparatus 10 is also operable in a plotting mode where instead of the previously described blade 24, a pen, pencil or other plotting tool is placed on the tool head 16 and a paper web is fed into the machine. The plotting mode is most often used to check the accuracy of the information defining the graphic to be produced before the more expensive signmaking stock is cut. A controller 38 is also provided for automatically operating the signmaking apparatus in accordance with stored data corresponding to the performance of the desired work operation.

Turning now to the description of the feed mechanism 14, and referring to FIG. 2, the web 12 is received between a plurality of nips 40 defined by a contoured drive roller 42 and a plurality of pinch wheels 43, 44 and 45, each supported by the frame 15 and spaced transversely across the width of the web 12. Each respective pinch wheel includes a solenoid 46 or other suitable actuator for actuating a plunger 48, having a friction roller 50 mounted at its lower end to a bracket 52. The friction roller 50 is made from a suitable material, such as, but not limited to a low durometer rubber, or other high coefficient of friction material. Additionally, each of the plungers 48 can be moved manually or in response to commands issued from the controller 38, in a direction generally indicated in FIG. 2 by the arrow "A", between a working position whereby the friction roller engages the work surface 28 of the worksheet 26, and a non-working position where the friction roller 50 is raised off of the work surface. When the pinch wheel is in the above-described working position, the friction roller 50 will be in rolling contact with the work surface 28, thereby urging the opposite surface 34 of the carrier sheet 30 against the surface of the drive roller 42, as best seen in FIG. 2.

In addition to moving between the working and non-working positions, pinch wheel 43 can be incrementally translated back and forth in the directions indicated by arrow B across the portion of the width of the web 12, in contact with the contoured surface of the roller 42. This motion can be accomplished by means of a linear drive 53 actuated in response to commands issued from the controller 38. The linear drive 53 can take many forms, such as, for example, a lead screw, a rack and pinion assembly, a motor drivingly connected to the pinch wheel 43 by a belt and pulley system, or a servo-type system, however, the invention is not limited in this regard as other linear drive systems known to those skilled in the art may be substituted without departing from the broader aspects of the present invention. Positioning of the pinch wheel 43 in the direction of arrow B while in the above-described working position will change the orientation of the web 12 with respect to the feed direction indicated generally by the arrow C. The manner in which this is accomplished will be explained in greater detail hereinafter.

Still referring to FIGS. 1 and 2, and as mentioned above, the surface of the roller 42 in the preferred embodiment is contoured at one end portion 54. The remainder of the roller 42, that is the central portion 56 and the opposite end portion 58, has a periphery that is substantially uniform in diameter. In the illustrated embodiment, the contoured end portion 54 of the roller is tapered having a diameter which continuously decreases from the roller's outer end 60 to the inner end 62 of the contoured end portion 54. A preferred taper is 0.020 inches per inch, however, the present invention is not limited in this regard. Depending on the particular position of the pinch wheel 43, the web 12 can be engaged at a point where the peripheral diameter of the contoured end portion 54 is greater than, equal to, or less than the diameter of the roller central and opposite end portion, 56 and 58 respectively. In addition to the foregoing, the roller 42 also includes a plurality of friction surfaces, 55, 57 and 59, best seen in FIG. 2, for gripping the web 12 as it is fed through the apparatus 10. Friction surfaces 55, 57, and 59 are made of a suitable material such as, but not limited to stainless steel, or a hard polymer. These friction surfaces 55, 57, and 59 define a plurality of substantially parallel peripheral rings of raised portions 91 and corresponding depressed portions 93 such that as the web 12 is fed through the apparatus, the raised portions contact the web 12 at a plurality of discreet points defined by the raised portions 91 thereby increasing the frictional/gripping forces imparted by the contact between surfaces 55, 57, and 59, and the web 12. In addition to increasing the frictional forces, the raised portions 91 create a pattern of indentations in the web which act much like the peripheral sprocket holes found on the edge portions of webs used in sprocket drives. Accordingly as the web is moved back and forth along a feed path through the apparatus, these indentations mate with the raised portions 91, thereby aiding in the maintenance of the web's alignment. In addition, the friction surfaces 55, 57 and 59 can comprise what are referred to by those skilled in the art as grit wheels. Typically, grit wheels consist of cylindrical stainless steel sections having knurled, etched, machined or bonded abrasives outer peripheries. To further enhance the gripping force between the roller 42 and the web 12, pinch wheels 44 and 45 are respectively positioned over friction surfaces 57 and 59 such that when in their respective working positions, the nips 40 are formed between the pinch wheels 43, 44, and 45 and the friction surfaces.

Figure 7:
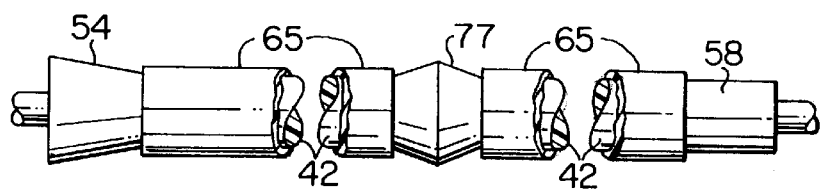
FIG. 7 shows an alternate embodiment of the drive roller employing a pair of low friction sleeves.

Still referring to FIG. 2, the portions of the roller 42, located between the friction surfaces 55 and 57, and 57 and 59 are coated with, or are comprised of a low friction material 63, such as, but not limited to, PTFE, or a hard plastic. Alternatively, and as shown in FIG. 7, these portions of the roller can be covered by sleeves 65, 65 fabricated from a low friction material, such as, but not limited to, PTFE, or a hard plastic. These low friction surfaces 63 and the sleeves 65 allow for relatively easy alignment of the web 12 by preventing binding between the web and the roller 42 in the areas between the aforementioned friction surfaces.

The roller 42 is rotatably mounted on the frame 15 in bearings 64, 64 and is rotatably driven by a suitable drive means, such as the motor 66. When the roller 42 is driven with the aforementioned pinch wheels in the working position and pinch wheel 43 pressing the web 12 against the contoured end portions 54 at a peripheral diameter greater than the diameter of the remainder of the roller, the web will be skewed to the left with respect to the feed direction. Conversely, if pinch wheel 43 is positioned such that it presses against the web at a location where the peripheral diameter of the contoured end portion is less than the substantially constant diameter of the remainder of the roller 47, the web will be skewed to the right with respect to the feed direction. Moreover, if the pinch wheel presses the web against a position on the contoured end portion 54 where the peripheral diameter is equal to the constant peripheral diameter of the remainder of the roller, then the web's alignment will not change. Thus, adjustments in the alignment of the web can be made by selectively translating the pinch wheel 43 while in its working position to an appropriate transverse position along the contoured end portion 54.

FIGS. 4a–4c illustrate examples of other possible contours for the roller 42. In FIG. 4a the peripheral diameter of the contoured end portion 54' of the roller 42' continuously increases from the outer end 60', where the peripheral diameter of the contoured end portion is less than the constant diameter of the central and opposite end portions of the remainder of the roller 42', to a maximum peripheral diameter at 67, where the peripheral diameter of the contoured end portion is greater than the constant peripheral diameter of the remainder of the roller, and then continuously decreases again to the inner end 62' where the diameter is again less than the constant diameter referred to above. This same general contour could also be formed as a continuous curve. Conversely, FIG. 4b illustrates a contour which is opposite to that shown in FIG. 2. The diameter of the contoured end portion 54" of the drive roller 62" is cone-shaped and continuously increases from the outer end 60", where the diameter is less than the constant diameter, to the inner end 62" where the diameter is greater than the constant diameter.

FIG. 4c illustrates a drive roller 68 having two contoured end portions 70, 70. Each of the ends is tapered with a peripheral diameter that continuously increases from an inner end 72, 72, where the diameter equals the constant diameter of the central portion 74 of the drive roller 68, to an outer end 76, 76, where the diameter is greater than the constant diameter. Since, neither end portion has a diameter which is less than the constant diameter of the central portion, this roller requires that both the pinch wheels 43 and 45 be incrementally translatable across the contoured end portion 70, 70 in the direction indicated by arrow B in order to re-align a skewed web 12.

Referring to FIGS. 2 and 3, the manner in which the signmaking apparatus 10 operates when the web 12 is initially fed into the apparatus, and the manner in which the web's alignment is maintained during operation will be explained. The web 12 includes two parallel edge portions 78 and 80 which extend along the length of the web, and a work area 82 located between the two parallel edge portions which also extends along the length of the web. A plurality of first and second lateral alignment indicia, generally indicated at 84, are printed along the length of the web on the opposite surface 34 of the carrier sheet and within the parallel edge portions 78 and 80 respectively. In the illustrated embodiment, the lateral alignment indicia includes a series of laterally aligned large hash marks 86, 86, oriented substantially perpendicular to the feed path as indicated by arrow C, and a series of laterally aligned smaller hash marks 88, 88 are disposed between the larger hash marks and also oriented substantially perpendicular to the feed path.

As the web 12 is initially fed into the signmaking apparatus 10, optical sensors 90 and 92 mounted on the frame 15, read the large hash marks 86, 86 in the lateral edge portions 78 and 80 respectively, and optical sensors 94 and 96, also mounted to the frame 15, read the smaller hash marks 88, 88 printed in the edge portions 78 and 80 respectively. When the optical sensors 90 and 92 record the passage of the large hash marks, a signal is sent to the controller 38 where the event is registered. As the web continues to be fed, the sensors 94 and 96 record the passage of the smaller hash marks 88, 88 and similarly forward signals to the controller 38 to register the event.

Since there are a fixed number of smaller hash marks 88, 88 disposed between the larger hash marks 86, 86, in the illustrated embodiment there are ten smaller hash marks printed between two consecutive larger hash marks, the controller 38 simply counts the number of smaller hash marks recorded by the sensors 94 and 96 between the passage of two consecutive larger hash marks as recorded by the sensors 90 and 92. If the controller registers or counts ten smaller hash marks recorded by the sensors 94 and 96 in an equal time period, then the controller determines that the web 12 is laterally aligned with the feed direction. If, however, the sensor 94 requires a longer period of time to record the passage of the ten smaller hash marks than the sensor 96 requires, then the controller determines that the web is skewed to the right with respect to the feed direction. Likewise, the controller determines that the web is skewed to the left with respect to the feed direction if the sensor 94 requires a shorter period of time to record the passage of the ten smaller hash marks than does the sensor 96.

As noted above, the controller 38 is operably connected to the drive 53 which translates the pinch wheel 43 transversely of the web in the direction indicated by arrow B. Accordingly, if the controller determines that the web is skewed to either the right of left, it issues a command-signal to the drive 53 to properly position the pinch wheel 43 transversely with respect to the width of the web to adjust the web's lateral alignment. In this manner, the web is brought into proper alignment with respect to the feed direction.

Once the web has been initially aligned with the feed path, it can then be continuously fed through the apparatus 10 to be worked on by the blade 24 or by another tool. As the work operation proceeds, the alignment of the web can be constantly monitored and adjusted, to insure that the web remains laterally aligned with the feed direction. This is accomplished in the same manner as described above with respect to initially aligning the web when it is first fed into the apparatus. That is, as the web is fed through the apparatus 10 by the feed mechanism 14, the optical sensors 90, 92 and 94, 96 read, respectively, the large and small hash marks printed on the opposite lateral edge portions of the web 12. If, as the web is being continuously fed through the apparatus, the controller 38 registers or counts ten smaller hash marks recorded by the sensors 94 and 96 in an equal time period, then the controller determines that the web 12 is laterally aligned with the feed direction. On the other hand, if the sensor 94 requires a longer or shorter period of time to record the passage of the ten smaller hash marks than the sensor 96 requires, then the controller determines that the web is being skewed either to the right or to the left with respect to the feed direction, as described above.

If either of the latter two conditions occur, the controller 38 forwards a command signal to the drive 53 to properly position the pinch wheel 43 transversely with respect to the width of the web along the contoured end portion 54 to adjust the web's lateral alignment. In this manner, the web is maintained in proper alignment with respect to the feed direction as the web is continuously fed through the apparatus and the work operation proceeds.

In addition, the lateral alignment procedure described above can be engaged initially in order to establish the initial tracking of the sheet material. Once the previously described patterns of indentations are placed in the sheet material, the alignment procedure may be stopped and the optical sensors 90, 92, 94 and 96 turned off.

As noted above, longitudinal misalignment of the web 12 can also occur. That is, as the web 12 is printed or cut, a particular longitudinal position on the work area 82 of the web can become bowed forwardly or rearwardly with respect to corresponding positions on the lateral edge portions of the web. To compensate for this misalignment, the web is provided with a series of hash marks 98 printed on the opposite surface 34 of the carrier sheet 30 and aligned with the larger hash marks 86, 86. An optical sensor 100 records the passage of the hash marks 98, 98 and sends an output signal to the controller 38 where the event is registered. If the passage of a set of laterally aligned hash marks 86, 86 and 98 is registered simultaneously by the controller 38, then the controller determines that the web is longitudinally aligned. If, however, the passage of the hash mark 98 occurs either before or after the passage of the hash marks 86, 86, then the controller determines that the work area 82 is bowed with respect to the lateral edge portions 78 and 80 of the web.

To correct for any longitudinal misalignment of the web 12 during a work operation, pinch wheel 44, as shown in both FIGS. 2 and 6, is equipped with an appropriate drive 51, such as, for example, a motor, a belt drive, or a gear drive such that the friction roller 50 can be driven or braked. In operation, the controller causes the pinch wheel 44 to frictionally engage the work surface 28 of the web 12 and selectively engages the drive motor 51 to drive or brake the pinch wheel thereby maintaining the longitudinal alignment of the work area 82 with the lateral edge portions of the web. If the pinch wheel 44 is driven, the bowed portion of the web is urged in the feed direction such that any rearward bowing of the web 12 is compensated for. Conversely, if pinch wheel 44 is braked the motion of the web is retarded thereby compensating for any forward bowing of the web.

Referring again to the lateral alignment indicia 84, the present invention is not limited to the pattern of alignment indicia illustrated in FIG. 3. In this regard, FIGS. 5a–5d illustrate examples of other types of indicia that would also serve to maintain the web in lateral alignment with the feed direction as the web is fed through the signmaking apparatus 12.

Figure 5A:
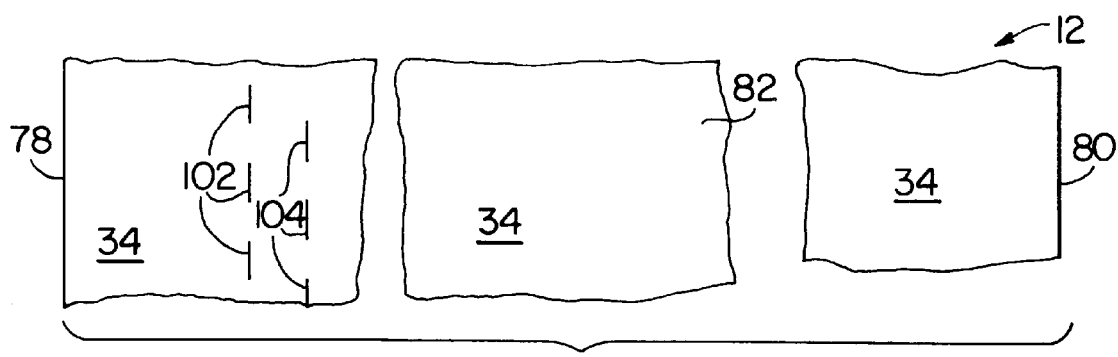
FIGS. 5a, 5b, 5c and 5d show alternative embodiments of the web shown in FIG. 1.

In FIG. 5a, the alignment indicia take the form of two parallel series of staggered hash marks 102, 104 printed along the length of the web within the lateral edge portion 78. If an optical sensor reads the passage of both series of hash marks, then the web is laterally aligned with the feed direction. If, however, the sensor records the passage of marks in only one of the series of staggered hash marks 102 or 104, then the controller determines that the web is skewed to the right or left, with respect to the feed direction.

Figure 5B:
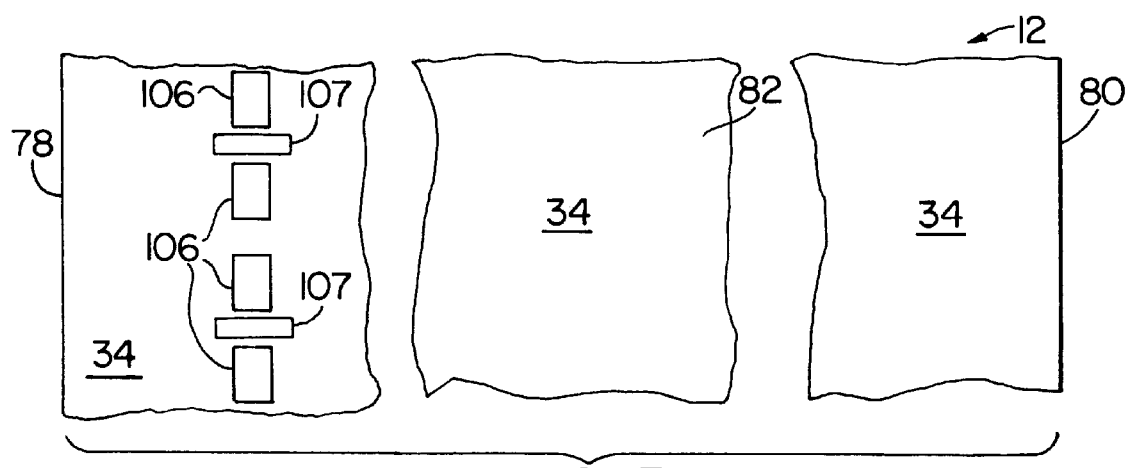
Figure 5C:
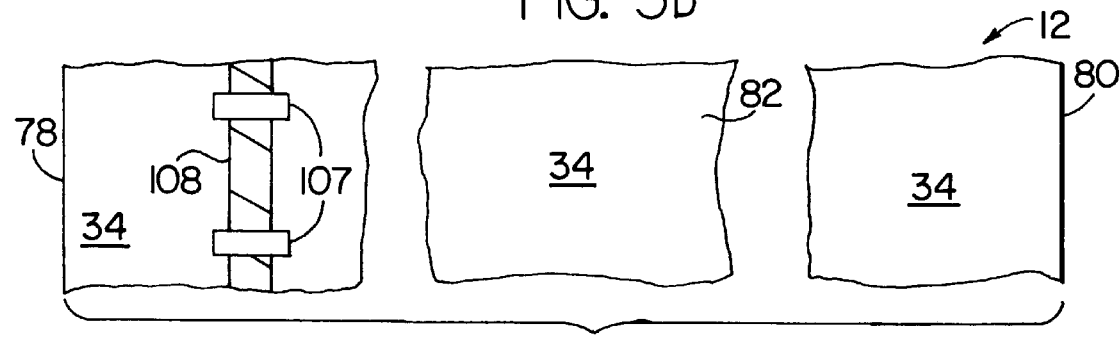

In FIG. 5b, the alignment indicia take the form of a series of aligned band segments 106, 106 printed along the length of the web within the lateral edge portion 78 and oriented parallel to the feed direction. If a pair of longitudinally displaced optical sensors 107, 107 detect an angular deviation of the bands from a set angle of 0° corresponding to the parallel alignment of the band segments with the feed direction, then the controller determines that the web is misaligned and that correction is required. FIG. 5c illustrates a similar arrangement except that a continuous band instead of spaced band segments is employed.

Figure 5D:
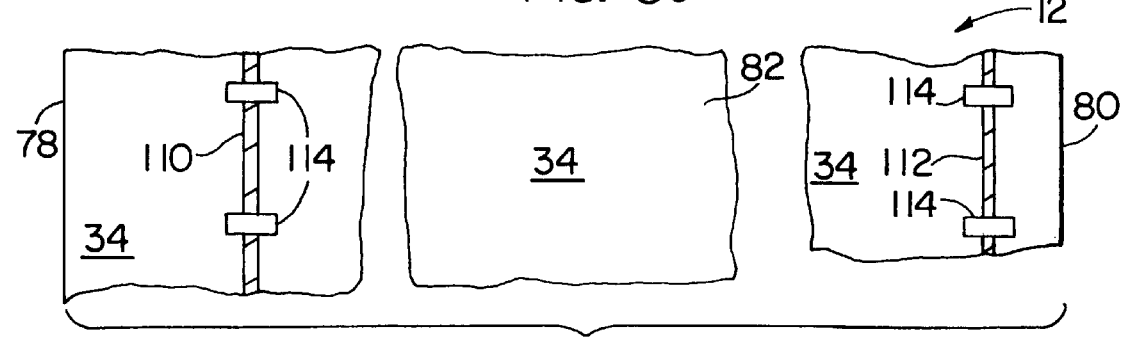

In FIG. 5d, lines 110 and 112 oriented parallel with the feed direction are printed in lateral edge portions 78 and 80 respectively. A pair of longitudinally spaced sensors 114, 114 is provided for each of the lines. If the sensors detect an angular deviation of the bands from a set angle of 0° corresponding to the parallel alignment of the band segments with the feed direction, then the controller similarly determines that the web is misaligned and that correction is required.

While preferred embodiments have been shown and described, various modifications and substitutions may be made without departing from the spirit and scope of the invention. In this connection, it should be appreciated that while in the preferred embodiment a conventional ink is used to print the alignment indicia and optical sensors used to record the passage of the indicia as the web is fed, other forms of indicia and sensing means can be utilized. For example, the indicia could be printed with a magnetic ink and magnetic sensors would be utilized to record the passage of the indicia. Additionally, the position of the edges of the web can be sensed by the aforementioned sensors and the controller can use the data from the sensors to determine an initial coarse web alignment. Once this determination and because the edges of the web are not necessarily straight, the alignment of the web can be fine tuned by sensing the lines 110, and 112.

Further, while the longitudinal alignment indicia 98, 98 are pre-printed on the opposite surface 34 of the carrier sheet 30, the signmaking apparatus could be provided with a printing head upstream of the tool head to print these indicia as the web is being fed. If the indicia are printed on the work surface 28, then printing with a non-visible ink is preferred.

It is also possible to eliminate the pinch wheel 44 which is operable by the controller to correct bowing in the work area 82 of the web 12. The controller could simply detect the degree of bowing in the work area and control the relative movement of the web and the tool head 16 relative to one another as the graphic 36 is formed in a manner which compensates for any longitudinal misalignment of the web.

Figure 8:
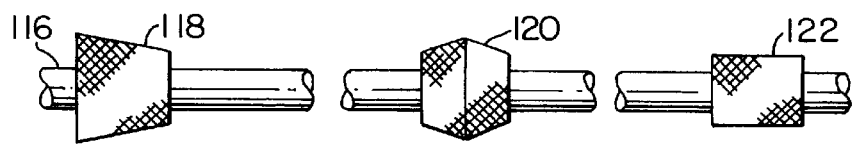
FIG. 8 shows an alternate embodiment of the drive roller.

Additionally, instead of drive roller 42, as shown in FIG. 2, the drive mechanism could incorporate an elongated drive shaft 116 upon which are carried rollers 118, 120, and 122 as shown in FIG. 8. When the drive shaft 116 and rollers 118, 120, and 122 are mounted in the signmaking apparatus, pinch wheels 43, 44 and 45, shown in FIG. 6, would be mounted over rollers 118, 120, and 122 respectively. Roller 118 as shown is contoured similarly to end portion 54, shown in FIG. 2. However, the invention is not limited in this regard. Accordingly, it will be recognized by those skilled in the art that several other contour geometries are possible. Roller 120 as shown has a contoured geometry similar to the geometry of end portion 54' as shown in FIG. 4a. As with roller 118, roller 120 is not limited in this regard. Accordingly, it will be recognized by those skilled in the art that several other contour geometries are possible. Roller 122 as shown in FIG. 8 is not contoured. However roller 122 is not limited in this regard and several other contour geometry's are possible. In addition, or alternatively, rollers 118, 120 and 122 can be knurled to further increase the gripping forces between the web 12 and the rollers during operation.

In an alternate embodiment of the present invention, the web is brought back into alignment by a displacement mechanism used to displace an end of the roller relative to the roller's axis of rotation. This can be accomplished in several different ways which will be explained in detail below.

Figure 9:
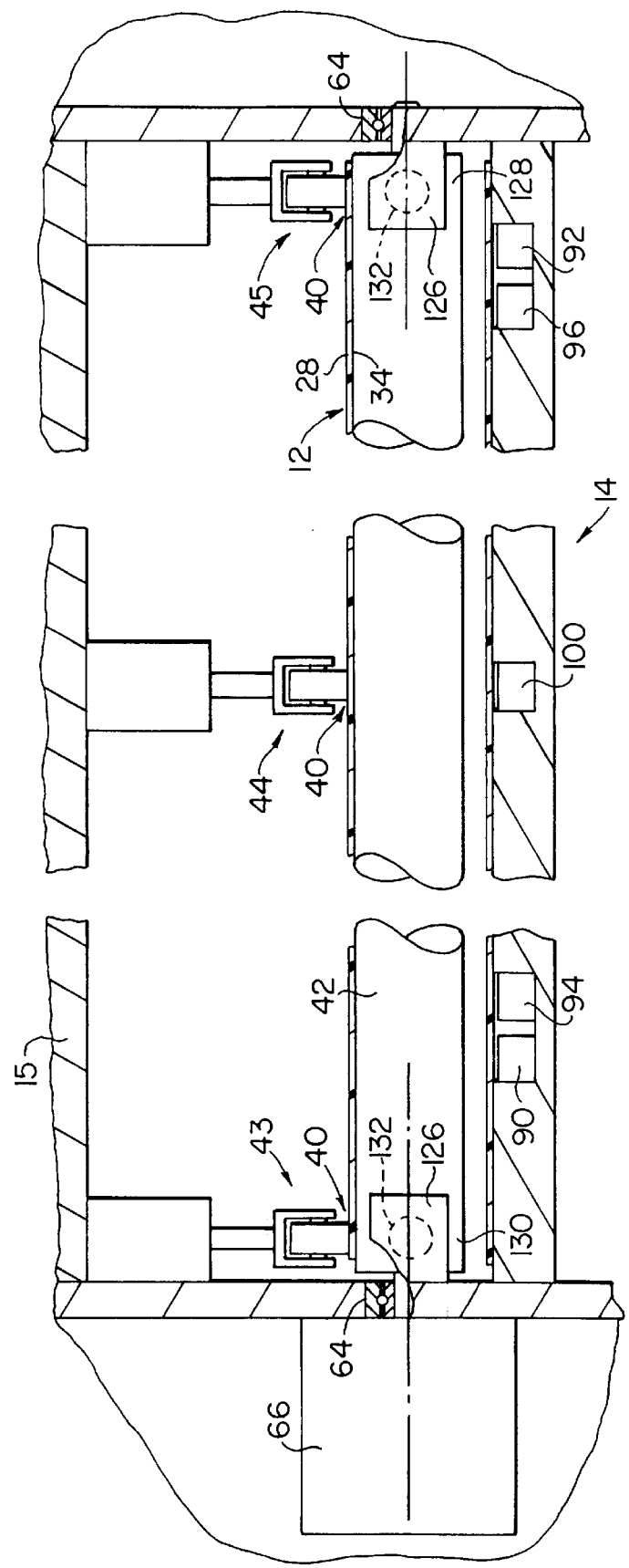
FIG. 9 shows an alternate embodiment of the apparatus of the present invention.

Referring to FIG. 9, the roller 42 is mounted at opposite ends in bearings 64, 64 that are supported by the frame 15. A suitable drive means 66, such as, for example, a motor, is drivingly associated with an end of the roller 42 for driving the roller about its longitudinal axis. A pair of directly opposed brackets 126, 126 extend from the frame 15 adjacent to the ends 128 and 130 of the roller 42. A piezoelectric drive 132 is attached to each bracket 126, 126 and engages a respective end 128, 130 of the roller 42.

During operation, if the web becomes skewed relative to the feed direction, the piezoelectric drives 132, in response to commands issued from the controller 38, engage and deflect the roller 42 thereby causing the web to re-align itself and track along the feed direction.

Figure 10:
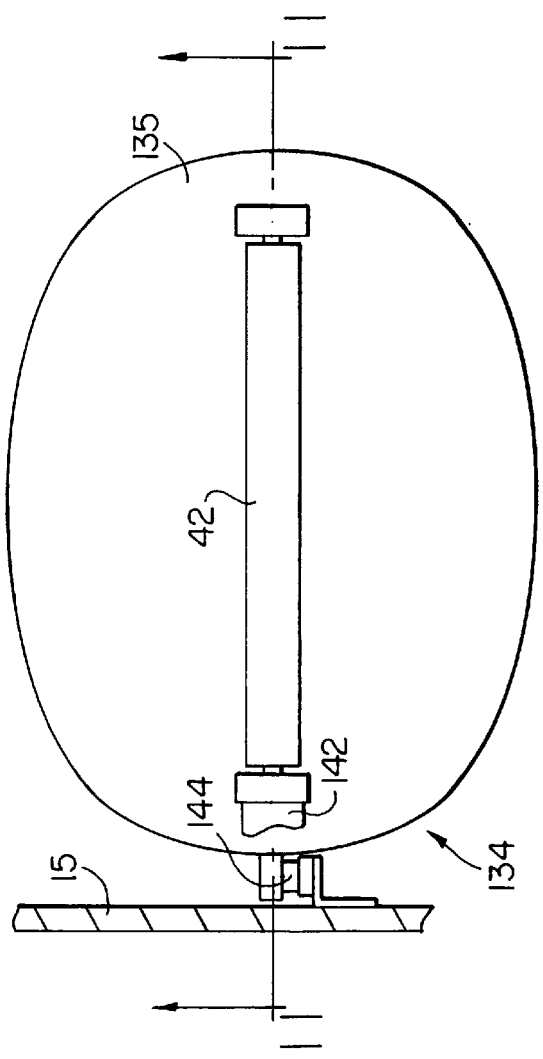
FIG. 10 shows an alternate embodiment of the apparatus of the present invention.

In another embodiment, illustrated in FIGS. 10 and 11, a roller support 134 has an upper surface 135 and a lower surface 136. A shaft portion 138 extends from the lower surface 136 and defines an axis of rotation 139. A bearing 140 is mounted in the frame 15 in recess 137 for rotatably supporting the roller support 134. The roller 42 is rotatably supported on the top surface 135 of the roller support 134. A suitable drive means 142 is associated with an end of the roller for driving the roller in response to commands issued from the controller 38. A piezoelectric drive 144 is engaged with the roller support 134 for rotating the roller support about the axis of rotation 139 in response to commands issued from the controller 38. In operation, if the web becomes skewed as it is being fed over the roller 42, the piezoelectric drive 144, will be actuated, thereby rotating the roller support 134, and offsetting the roller 42 relative to the web, thus causing the web to be reoriented along the feed direction.

Figure 12:
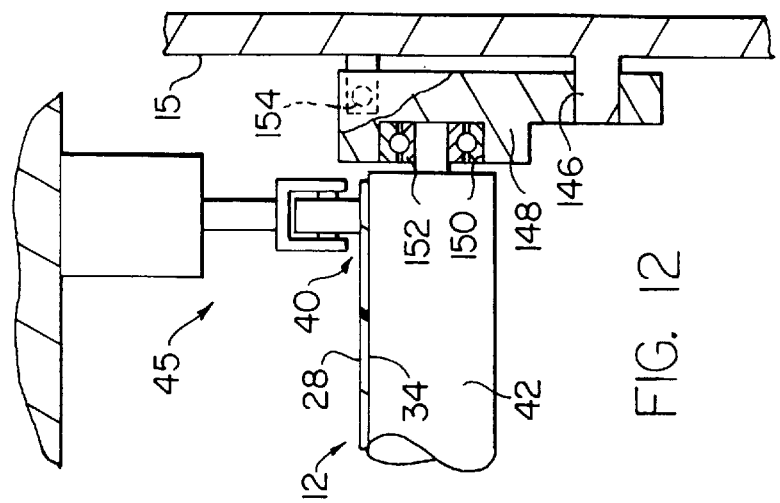
FIG. 12 shows an alternate embodiment of the present invention.

In still another embodiment shown in FIG. 12, a shaft member 146 extends from the frame 15. A bearing housing 148 having a bore 150 is pivotally mounted on the shaft member 146. A bearing 152 is supported in the bore 150 for rotatably receiving an end of the roller 42. A piezoelectric drive 154 is mounted to the frame 15 and is in communication with the bearing housing 148 for pivoting the bearing housing about the shaft member 146 in response to commands issued from the controller 38.

Figure 13:
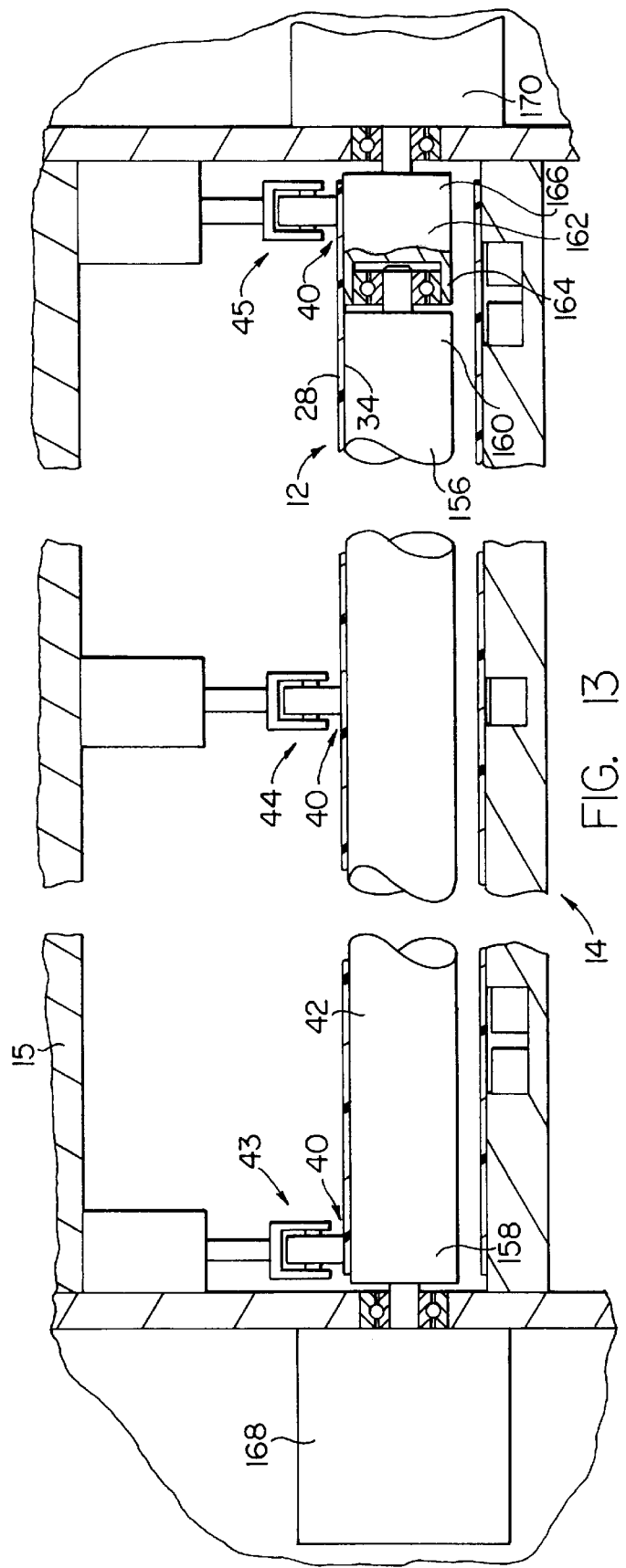
FIG. 13 shows an alternate embodiment of the present invention.

In yet a further embodiment, illustrated in FIG. 13, roller 42 consists of a first roller section 156 having first and second ends 158 and 160 respectively, and a second roller section 162, also having first and second ends 164 and 166 respectively. The first roller section 156 is rotatably mounted at its first end 158 to the frame 15. The second roller section 162 is rotatably mounted at its first end 164 to the second end 160 of the first roller section 156, with the second end 166 of the second roller section being rotatably mounted to the frame 15. A first drive means 168 is drivingly associated with the first end 158 of the first roller section 156 for driving the first roller section at a predetermined speed in accordance with commands issued from the controller 38. A second drive means 170 is drivingly associated with the second end 166 of the second roller section 162 for driving the second roller section at a rotational speed equal to, or different from the speed of the first roller section 156.

During operation, if the web becomes skewed relative to the feed direction as it passes over the roller 42, the second drive means 170 will cause the rate of rotation of the second roller section 162 to either increase or decrease, depending on the skewed orientation of the web, thereby driving the web back into alignment with the feed direction.

Figure 14:
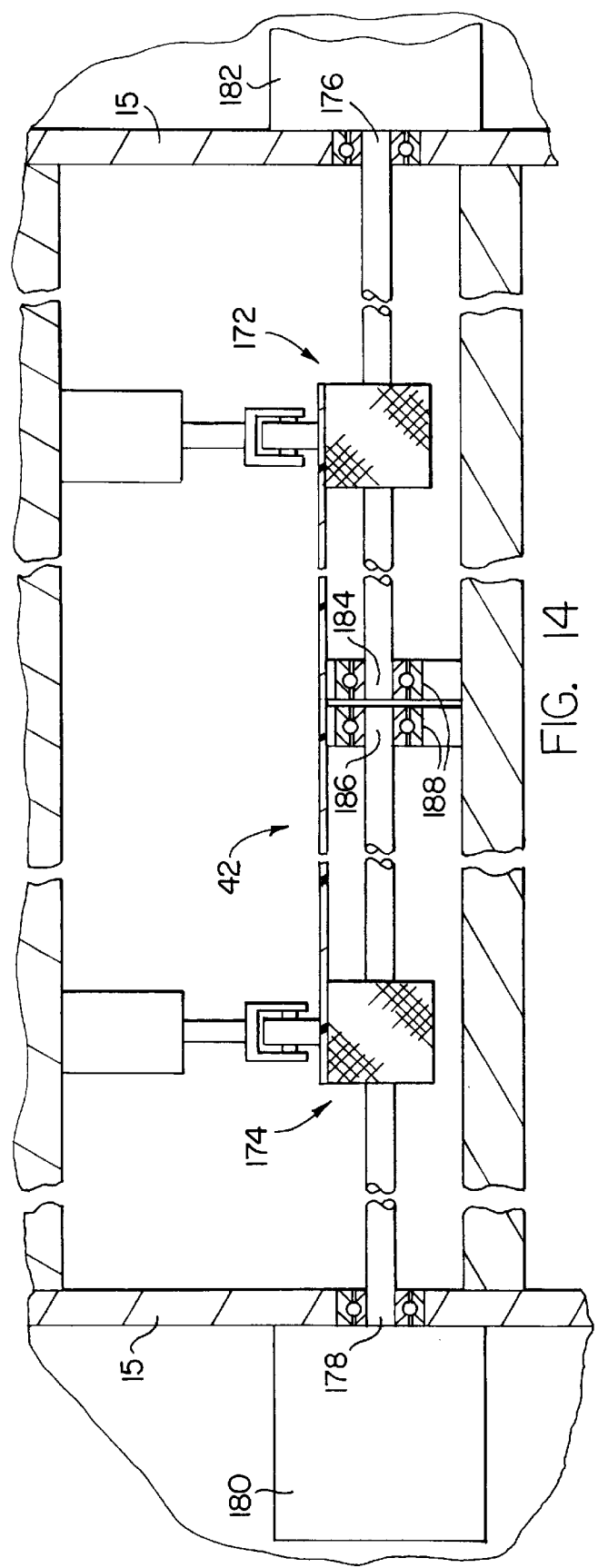
FIG. 14 shows an alternate embodiment of the present invention.

In still a further embodiment, shown in FIG. 14, the roller 42 comprises a composite roller made up of first roller section 172 and second roller section 174 coaxial with the first roller section. The first end 176 of the first roller section 172 and the first end 178 of the second roller section 174 are rotatably mounted to the frame 15 with the first and second roller section, 172 and 174 being coupled to first and second drive means, 180 and 182 respectively. The first and second roller section 172 and 174 each include second ends, 184 and 186 rotatably mounted in bearings 188, 188 which in turn are mounted on the frame 15. During operation if the web becomes skewed, the rate of rotation of either the first or second roller section, 172 or 174 respectively will increase or decrease in response to commands issued from the controller, thereby bringing the web back into alignment.

While preferred embodiments of the present invention have been shown and described, various modifications and substitutions may be made without departing from the spirit and scope of the invention. Accordingly, it is to be understood that the present invention has been described by way of example, and not by limitation.

What is claimed is:

1. A web feeding and handling apparatus comprising:
   a roller mounted for rotation about a longitudinal roller axis extending perpendicular to the feed path, the roller being movable between a first position wherein the roller axis is approximately perpendicular to a web feed direction and a deflected position when a portion of the roller axis is displaced away from the first position;
   a displacement mechanism engageable with the roller for moving the roller between the first and deflected positions;
   a plurality of pinch wheels spaced along the roller for movement between a working position, and a non-working position, the axis of each pinch wheel being parallel with the roller axis during operation of the web feeding and handling apparatus;
   said pinch wheels in the working position cooperating with the roller to define a nip for receiving the web;
   a tool engageable with the web and moveable relative thereto for performing a work operation on the web;
   a controller for generating control signals corresponding to the work operation to be performed on the web; and
   drive means for rotationally driving the roller according to signals issued from the controller.

2. A web feeding and handling device as defined by claim 1, wherein the roller displacement mechanism comprises:
   a sensor for generating signals receivable by the controller, and corresponding to the magnitude of the roller displacement; and
   means for applying a force substantially perpendicular to the roller's longitudinal axis for deflecting an end portion of the roller away from the longitudinal roller axis in accordance with commands issued from the controller.

3. A web feeding and handling device as defined by claim 2, wherein said means for applying a force comprises a piezoelectric drive.

4. A web feeding and handling device as defined by claim 1, wherein the roller includes a plurality of sections having friction surfaces defining a plurality of raised and corresponding depressed portions such that during operation the plurality of raised portions contact the web at a plurality of discreet locations thereby increasing the gripping force between the web and the roller during operation.

5. A web feeding and handling device as defined by claim 4, wherein the plurality of sections having friction surfaces are grit wheels.

6. A web feeding and handling device as defined by claim 1, wherein the roller displacement mechanism comprises:
   a roller support rotatably mounted to the frame;
   the roller being rotatably mounted on the roller support;
   at least one actuator mounted to the frame and in communication with the roller support for selectively rotating the roller support in response to commands issued from the controller, thereby changing the orientation of the roller with respect to the frame.

7. A web feeding and handling device as defined by claim 6, wherein the roller support is a turntable.

8. A web feeding and handling device as defined by claim 7, wherein the turntable has a lower surface having a shaft portion extending therefrom and defining an axis of rotation; and wherein the frame defines a recess containing a bearing for rotatably receiving the shaft portion.

9. A web feeding and handling device as defined by claim 6, wherein the actuator is a piezoelectric drive.

10. A web feeding and handling device as defined by claim 1, wherein the roller displacement mechanism comprises:

a mounting shaft extending from the frame;

a bearing housing defining a bearing bore pivotally mounted on the mounting shaft;

a bearing disposed within the bearing bore for rotatably receiving an end of the roller;

at least one actuator mounted to the frame and in communication with the bearing housing for selectively pivoting the bearing housing about the mounting shaft, thereby deflecting the roller in response to commands issued from the controller.

11. A web feeding and handling device as defined by claim 10, wherein the actuator is a piezoelectric drive.

* * * * *